United States Patent [19]

Omata et al.

[11] Patent Number: 4,771,020

[45] Date of Patent: Sep. 13, 1988

[54] OPTICAL GLASS

[75] Inventors: Hajime Omata, Hachiouji; Nobuhiro Nozawa, Shiroyama, both of Japan

[73] Assignee: Kabushiki Kaisha Ohara, Sagamihara, Japan

[21] Appl. No.: 80,402

[22] Filed: Jul. 31, 1987

Related U.S. Application Data

[63] Continuation-in-part of Ser. No. 838,370, Feb. 25, 1986, abandoned.

[30] Foreign Application Priority Data

Mar. 26, 1985 [JP] Japan ................................. 60-61510

[51] Int. Cl.$^4$ .......................... C03C 3/253; C03C 3/16
[52] U.S. Cl. ...................................... 501/42; 501/44; 501/45; 501/48; 501/905
[58] Field of Search ...................... 501/41, 42, 44, 45, 501/48, 905

[56] References Cited

U.S. PATENT DOCUMENTS 3,149,234  9/1964  Hood et al. ........................ 501/45
4,439,530  3/1984  Tajima .............................. 501/45
4,517,006  5/1985  Drake et al. ...................... 501/45

Primary Examiner—Steven Capella
Attorney, Agent, or Firm—Ladas & Parry

[57] ABSTRACT

An optical glass which is a $P_2O_5$ system glass including ingredients selected from two groups of $R_2O_3$ ingredients of specific contents have excellent resistivity to devitrification, homogeneity, light transmissivity and chemical durability.

1 Claim, No Drawings

OPTICAL GLASS

This is a continuation-in-part of copending application Ser. No. 838,370 filed on Feb. 25, 1986, now abandoned.

BACKGROUND OF THE INVENTION

This invention relates to a phosphate system optical glass which is excellent in resistivity to devitrification, light transmissivity in ultraviolet and visible regions and homogeneity and has negative anomalous partial dispersion of a flint glass type.

If a design of an optical system such as a design of an object lens for a camera or a microscope, it is desired to remove secondary spectrum over a wide wavelength range. For this purpose, it is known to be effective to use a glass which has a smaller partial dispersion ratio ($\theta g \cdot F$) than a glass of normal dispersion having a linear proportional relation between Abbe's number ($\nu d$) and partial dispersion ratio ($\theta g \cdot F$) and therefore has negative anomalous partial dispersion ($-\Delta \nu d$).

As a glass having negative anomalous partial dispersion, U.S. Pat. No. 2,684,304 discloses a $P_2O_5$-PbO system glass containing an extremely large amount of PbO ingredient and practically an extremely small amount of $Al_2O_3$ ingredient. This glass, however, is so poor in resistivity to devitrification that it is difficult to obtain a sufficiently clear glass. Japanese Patent Publication No. 36-16726 discloses a $P_2O_5$-$B_2O_3$-PbO-$Al_2O_3$ system glass. This glass, however, is not sufficient in resistivity to devitrification so that it is not suitable for mass production and, besides, this glass is poor in light transmissivity in the ultraviolet and visible regions. Japanese Preliminary Patent Publication No. 59-3044 discloses a $B_2O_3$-$Sb_2O_3$-ZnO-$SiO_2$-$Al_2O_3$-$ZrO_2$ system glass. This glass, however, tends to be tinted yellow and besides it is difficult to homogenize this glss in melting it.

In phosphate system glasses, there is known a glass disclosed in Japanese Patent Publication No. 38-8459 which is of a $P_2O_5$-$B_2O_3$-(PbO/$Sb_2O_3$/$Bi_2O_3$ etc.) system. It is difficult, however, to obtain anomalous partial dispersion of a desired value in this glass. Besides, this glass is inferior in light transmissivity and chemical durability.

It is therefore an object of the present invention to eliminate the above described disadvantages of the prior art glasses and provide an optical glass which has a value within a range of $\nu d = 45$ to 25 which is within a flint glass region and a negative anomalous partial dispersion within a range of $|-\Delta \nu d| \geq 0.1$ and which is excellent in resistivity to devitrification, light transmissivity in the ultraviolet and visible regions and homogeneity.

SUMMARY OF THE INVENTION

Accumulated studies and experiments made by the inventors of the present invention in an attempt to improve the above described prior art anomalous partial dispersion glasses have resulted in a finding, which has led to the present invention, that an optical glass having the above described desired properties can be obtained by combining a $P_2O_5$ system glass with a specific amount of $R_2O_3$ ingredient or ingredients, i.e., one or two ingredients selected from an ingredient group of $Sb_2O_3$, and $Bi_2O_3$, and a specific amount of another $R_2O_3$ ingredient or ingredients, i.e., one or more ingredients selected from an ingredient group of $Y_2O_3$, $La_2O_3$, $Gd_2O_3$, $Yb_2O_3$, $Lu_2O_3$, $Ga_2O_3$, $In_2O_3$ and $Al_2O_3$ respectively as essential ingredients.

The optical glass achieving the above described object of the invention is characterized in that the glass consists essentially of in weight percent the following ingredients:

| | |
|---|---|
| $P_2O_5 + GeO_2$ | 25~65%, |
| in which $P_2O_5$ | 5~65%, |
| $GeO_2$ | 0~55%, |
| $Sb_2O_3 + Bi_2O_3$ | 0.5~65%, |
| $Sb_2O_3 + Bi_2O_3$ | 34~74%, |
| in which $Sb_2O_3$ | 0~50%, |
| $Bi_2O_3$ | 0~25%, |
| PbO | 0~63%, |
| $Y_2O_3 + La_2O_3 + Gd_2O_3 + Yb_2O_3 +$ | 1~15%, |
| $Lu_2O_3 + Ga_2O_3 + In_2O_3 + Al_2O_3$ | |
| in which $Y_2O_3$ | 0~10%, |
| $La_2O_3$ | 0~10%, |
| $Gd_2O_3$ | 0~15%, |
| $Yb_2O_3$ | 0~10%, |
| $Lu_2O_3$ | 0~10%, |
| $Ga_2O_3$ | 0~10%, |
| $In_2O_3$ | 0~15%, |
| $Al_2O_3$ | 0~5%, |
| $Li_2O + Na_2O + K_2O + Cs_2O$ | 0~10%, |
| $MgO + CaO + SrO + BaO$ | 0~20%, |
| ZnO | 0~20%, |
| $As_2O_3$ | 0~10%, |
| and a total amount of $F_2$ contained in a fluoride or fluorides substituted for any of these metal oxide ingredients | 0~10%. |

DETAILED DESCRIPTION OF THE INVENTION

In the optical glass made according to the invention, the above described content ranges of the respective ingredients have been selected for reasons stated below.

The $P_2O_5$ ingredient and the $GeO_2$ ingredient added to $P_2O_5$ are principal glass forming oxides for the glass of the present invention and the total amount of these ingredients should be 25% or more, preferably 30% or more for maintaining stability of the glass. If, however, the total amount of these ingredients exceeds 65%, the required $\nu d$ value cannot be obtained. In these ingredients, if the $P_2O_5$ ingredient is less than 5%, the glass tends to become unstable and significantly tinted. The $GeO_2$ ingredient is effective in broadening the glassified range. If, however, the amount of this ingredient exceeds 55%, the required $\nu d$ value cannot be obtained and besides the melting property of the glass sharply decreases.

In the glass of the present invention, $Sb_2O_3$, and $Bi_2O_3$ are important ingredients which have been found to have remarkable effects in increasing the negative $\Delta \nu d$ value and stabilizing the glass. For these ingredients to achieve these effects, the total amount of one or two of these ingredients must be within the range of 0.5-65%. Further, for maintaining the required $\Delta \nu d$ value and $\nu d$ value of the invention, the total amount of these ingredients and the PbO ingredient which is an optional ingredient must be within the range of 34-74%. If the $Sb_2O_3$ and $Bi_2O_3$ contents exceed 50% and 25% respectively and the PbO content exceeds 63%, maintaining of a negative $\Delta \nu d$ value in the glass becomes difficult and transmissivity in the ultraviolet region tends to decrease. Further, if the PbO content exceeds the above percentage, abrasion resisting property of the glass tends to become too low. In the glass of the present invention, the $Y_2O_3$, $La_2O_3$, $Gd_2O_3$, $Yb_2O_3$, $Lu_2O_3$, $Ga_2O_3$, $In_2O_3$ and $Al_2O_3$ ingredients are effective in improving stability and chemical durability of the glass. For achieving these effects, the total amount of one or more of these ingredients must be within the range of 1-15%. If, however, each of the $Y_2O_3$, $La_2O_3$, $Yb_2O_3$ and $Lu_2O_3$ contents exceeds 10% and the $Gd_2O_3$ content exceeds 15%, the glass tends to become unstable. If the $Ga_2O_3$, $In_2O_3$ and $Al_2O_3$ contents exceed 10%, 15% and 5% respectively, it becomes difficult to obtain a negative $\Delta\nu d$ value. Besides, if the $Ga_2O_3$ and $Al_2O_3$ contents exceed the above percentage, the stability and melting property of the glass tend to decrease. If the $In_2O_3$ content exceeds the above percentage, the glass tends to become tinted.

The ingredients described below may be added to the glass according to necessity for controlling refractive index (Nd), $\nu d$, $\theta g \cdot F$ and $\Delta \nu d$ and also for improving resistivity to devitrification and chemical durability of the glass.

For improving the melting property of the glass, the $Li_2O$, $Na_2O$, $K_2O$ and $Cs_2O$ ingredients may be added up to 10%, preferably up to 5%, in the total amount of one or more of these ingredients within the range in which the required $\Delta\nu d$ value and stability can be maintained. For controlling optical constants, the MgO, CaO, SrO, BaO and ZnO ingredients may be added up to 20%, preferably up to 10%, in the total amount of one or more of these ingredients within the range in which the chemical durability and the required $\Delta\nu d$ value and $\nu d$ value can be maintained. The $As_2O_3$ ingredient may be added up to the content of 10% without imparting deliquescence to the glass. For controlling the optical constants and improving the chemical durability of the glass, any one or more of the above described metal oxides may be substituted by a fluoride or fluorides up to the content of 10% in terms of the total amount of $F_2$ contained in the substituting fluoride or fluorides.

The $B_2O_3$ ingredient is not a preferable ingredient because it decreases light transmissivity in the ultraviolet region of the glass. Nevertheless, this ingredient may be added, if necessary, in the content of a few percent. The $Ta_2O_5$, $Nb_2O_5$, $WO_3$, $TeO_2$ and $TiO_2$ ingredients are not preferable ingredients because they tend to tint the glass. These ingredients, however, may also be added, if necessary, in the content of a few percent for each of them. The $SiO_2$ and $ZrO_2$ ingredients deteriorate the melting property of the glass but they may be added up to about 3% and 2% respectively. Addition of $Tl_2O_3$ is effective for imparting a negative $\Delta Vd$ valve but nethertheless is not preferable, because, as is well known, $Tl_2O_3$ has a rather strong toxicity.

The following Table 1 shows examples of compositions (No. 1-No. 37) of the glass according to the invention as well as the optical constants (Nd, $\nu d$, $\theta g \cdot F$ and $\Delta \nu d$). Table 2 shows comparative examples (No. I and No. II) of the prior art $P_2O_5$-PbO system glass having approximately the same optical constants as these examples of the glass of the invention. For determining the $\Delta\nu d$ value in these Tables, optical glasses F2 and K7 are selected as standard normal dispersion glasses and the $\Delta \nu d$ value is expressed as deviation from a line passing on the distribution points of these glasses on the $\nu d - \theta g \cdot F$ coordinates.

Tables 1 and 2 also show results of devitrification tests conducted for the respective glasses. The devitrification test was conducted by placing, in a platinum crucible of 50 cc, 80 grams of each glass specimen which was obtained by quenching a previously melted glass, melting the glass specimen in an electric furnace for two hours at about 900°-1250° C. depending upon melting property of each glass thereafter lowering the temperature to keep the glass speciment at the temperatures of 850° C. and 750° C. for one hour, taking the glass specimen out of electric furnace and observing whether there is devitrification or not by naked eye. In the tables, glasses in which devitrification was not observed is indicated by a circle and ones in which devitrification was clearly observed by a cross. As will be apparent from the tables, all of the glasses of the examples of the present invention are clear and show the improved effect in resistivity to devitrification as compared to the glasses of the comparative examples (No. I and No. II) which gave rise to devitrification.

The glasses of the examples of the present invention are all transparent and free from tinting, with the degree of tinting (expressed by wavelength (unit: nm) at which transmissivity of a ground specimen of a thickness of 10 mm is 80%) being in the range of about 280-390 and thus exhibiting an excellent light transmissivity. Further, results of an acid-proofness test conducted by the powder method according to the Japan Optical Glass Industry Standard are Class 1 to Class 3 for all of the glasses of the examples of the invention, exhibiting excellent chemical durability.

The glasses of the examples of the invention can be easily produced by melting mixture of raw materials including, for example, phosphates, nitrates, carbonates, oxides and fluorides of various metals at the temperature of about 850°-1200° C. in a melting apparatus such as a platinum crucible, stirring the mixture to homogenize it, lowering the temperature and casting or pressing the melt and thereafter annealing it.

TABLE 1

(Weight percent)

| No | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $P_2O_5$ | 32 | 30 | 40 | 35 | 35 | 38 | 38 | 40 | 5 | 30 | 30 | 30 | 30 | 10 |
| $Sb_2O_3$ | 2 | 8 | 34 | 20 | 30 | 30 | 10 | 20 | 38 | 1 | 4 | 10 | 10 | 38 |
| $Bi_2O_3$ | | | | | | | | | | | | | | |
| $SbO$ | 63 | | 10 | | | | | | | 59 | 63 | 55 | 48 | |
| Other $R_2O_3$ | $La_2O_3$ 3 | $In_2O_3$ 2 | $In_2O_3$ 1 | $Gd_2O_3$ 4 $Lu_2O_3$ 1 | $In_2O_3$ 15 | $Ga_2O_3$ 2 | $In_2O_3$ 2 | $La_2O_3$ 10 | $In_2O_3$ 2 | $Ga_2O_3$ 8 $La_2O_3$ 2 | $Gd_2O_3$ 3 | $Ga_2O_3$ 3 $La_2O_3$ 2 | $Gd_2O_3$ 2 | $In_2O_3$ 2 |
| Other oxides | | $ZnO$ 20 | | | | $BaO$ 10 | | | $GeO_2$ 55 | | | | $ZnO$ 10 | $GeO_2$ 50 |
| Fluorides ($F_2$) | | | $PbF_2$ 15 (2.32) | | | | | | | | | | | |
| $\eta d$ | 1.78603 | 1.76149 | 1.76309 | 1.77181 | 1.75625 | 1.74766 | 1.73829 | 1.73363 | 1.74191 | 1.79442 | 1.80758 | 1.79302 | 1.78803 | 1.73778 |
| $vd$ | 32.2 | 34.5 | 32.6 | 32.8 | 34.2 | 34.8 | 34.7 | 36.0 | 30.6 | 32.4 | 31.3 | 32.3 | 32.7 | 31.5 |
| $\theta g \cdot F$ | 0.5850 | 0.5780 | 0.5782 | 0.5800 | 0.5794 | 0.5775 | 0.5761 | 0.5783 | 0.5868 | 0.5883 | 0.5880 | 0.5844 | 0.5844 | 0.5812 |
| $\Delta vd$ | −2.6 | −4.6 | −6.4 | −5.1 | −4.1 | −4.6 | −5.6 | −2.9 | −3.1 | −0.4 | −1.7 | −2.9 | −2.5 | −5.6 |
| Result of devitrification test | | | | | | | ←o→ | | | | | | | |

| No | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| $P_2O_5$ | 43 | 35 | 37 | 64 | 40 | 41.5 | 43 | 42 | 50 | 43 | 48 | 43 | 40 | 38 |
| $Sb_2O_3$ | | 2.5 | 2 | 10 | 3 | 2 | 1 | 2 | 40 | | 40 | 1 | 10 | 10 |
| $Bi_2O_3$ | 1 | 2.5 | | 25 | | | | | | | | | | |
| $Tl_2O_3$ | | | | | | | | | | 5 | | | | |
| $PbO$ | | | | | | | | | | | | | | |
| Other $R_2O_3$ | $La_2O_3$ 1.5 $Y_2O_3$ 1.5 | $Gd_2O_3$ 1 | $La_2O_3$ 3 | | $La_2O_3$ 2 | $Y_2O_3$ 2.5 | $Al_2O_3$ 1 | $Al_2O_3$ 1 | $Ga_2O_3$ 5 | $La_2O_3$ 2 | $Ga_2O_3$ 10 | | $Yb_2O_3$ 5 | $Gd_2O_3$ 10 |
| Other oxides | $GeO_2$ 4 | | | | | | $SrO$ 2 | | | $La_2O_3$ 2 $Ga_2O_3$ 1 | $CaO$ 2 | | | $Na_2O$ 2 |
| Fluorides ($F_2$) | | | | | | | $AlF_3$ 1 (0.68) | | $AlF_3$ 5 (3.39) | | | $LaF_3$ 7 (2.04) | | |
| $\eta d$ | 1.75262 | 1.76323 | 1.74819 | 1.68675 | 1.71457 | 1.70878 | 1.69674 | 1.70283 | 1.68872 | 1.70286 | 1.68239 | 1.69555 | 1.71775 | 1.72162 |
| $vd$ | 33.6 | 33.3 | 34.4 | 36.8 | 36.4 | 36.8 | 38.0 | 37.5 | 37.8 | 37.1 | 38.2 | 38.8 | 36.0 | 36.7 |
| $\theta g \cdot F$ | 0.5811 | 0.5773 | 0.5781 | 0.5745 | 0.5737 | 0.5728 | 0.5726 | 0.5717 | 0.5710 | 0.5709 | 0.5694 | 0.5698 | 0.5767 | 0.5764 |
| $\Delta vd$ | −3.6 | −6.2 | −4.7 | −4.5 | −5.4 | −5.5 | −4.4 | −5.5 | −5.6 | −6.4 | −6.2 | −5.4 | −3.9 | −3.5 |
| Result of devitrification test | | | | | | | ←o→ | | | | | | | |

| No | 29 | 30 | 31 | 32 | 33 | 34 | 35 | 36 |
|---|---|---|---|---|---|---|---|---|
| $P_2O_5$ | 40 | 40 | 43 | 42 | 56 | 39 | 10 | 40 |
| $Sb_2O_3$ | | 1 | 1 | 2 | 2 | 10 | 48 | 10 |
| $Bi_2O_3$ | 2 | | | | | | | |
| $Tl_2O_3$ | | | | | | | | |
| $PbO$ | | | 49 | 54 | 38 | 47 | | 40 |
| Other $R_2O_3$ | $Al_2O_3$ 3 | $In_2O_3$ 5 $As_2O_3$ | $La_2O_3$ 2 | $La_2O_3$ 1 | $Ga_2O_3$ 1 | $Y_2O_3$ 3 | $In_2O_3$ 2 | $Y_2O_3$ 10 |
| Other oxides | | | | | | $MgO$ | $GeO_2$ | |

| No | 37 |
|---|---|
| $P_2O_5$ | 40 |
| $Sb_2O_3$ | 1 |
| Other $R_2O_3$ | $In_2O_3$ 5 $As_2O_3$ |
| Other oxides | 34 |

TABLE 1-continued

| Fluorides (F$_2$) | PbF$_2$ 55 (8.52) | 5 | ZnF$_2$ 5 (1.84) | AlF$_3$ 1 (0.68) | LiF 3 (2.20) | 1 | 40 | 1 | 4 BaO 16 |
|---|---|---|---|---|---|---|---|---|---|
| ηd | 1.71933 | 1.71284 | 1.72999 | 1.70085 | 1.62670 | 1.72517 | 1.78077 | 1.70982 | 1.67380 |
| νd | 36.6 | 36.8 | 35.8 | 37.7 | 43.9 | 35.5 | 29.1 | 37.3 | 40.5 |
| θg·F | 0.5730 | 0.5721 | 0.5767 | 0.5720 | 0.5619 | 0.5772 | 0.5881 | 0.5744 | 0.5679 |
| Δνd | −5.6 | −6.0 | −4.1 | −5.1 | −5.1 | −4.1 | −3.8 | −4.1 | −4.8 |
| Result of devitrification test | | | | | ←─o─→ | | | | |

TABLE 2

| No | I | II (weight percent) |
| --- | --- | --- |
| $P_2O_5$ | 24.69 | 27.01 |
| $Sb_2O_3$ | | |
| $Bi_2O_3$ | 3.30 | |
| PbO | 71.11 | 66.83 |
| Other $R_2O_3$ | | |
| Other oxides | | SrO 3.46 |
| Fluorides ($F_2$) | $AlF_3$ 0.36 | $AlF_3$ 1.08 |
| | NaF 0.54 | NaF 1.62 |
| $\eta d$ | 1.747 | 1.717 |
| $\nu d$ | 33.8 | 35.8 |
| $\theta g \cdot F$ | 0.579 | 0.577 |
| $\Delta \nu d$ | −4.9 | −4.1 |
| Result of devitrification test | x | x |

The optical glass of the present invention which is a $P_2O_5$ system glass including ingredients selected from two groups of $R_2O_3$ ingredients of specific contents can comprehensively improve resistivity to devitrification, homogeneity, light transmissivity and chemical durability as compared to the prior art glasses. Thus, the glass of the present invention can be manufactured on mass production basis as optical materials for various uses. These optical materials made according to the invention are applicable not only to uses requiring negative anomalous partial dispersion but also to uses requiring an excellent light transmissivity such as a window glass for ultraviolet ray and a total absorption counter for energy measurement of high energy particles. The glass of the present invention therefore has a great industrial utility.

What is claimed is:

1. An optical glass consisting essentially of the following ingredients in weight percent:

| An optical glass | the following ingredients in weight percent: |
| --- | --- |
| $P_2O_5 + GeO_2$ | 25∼65%, |
| in which $P_2O_5$ | 5∼65%, |
| $GeO_2$ | 0∼55%, |
| $Sb_2O_3 + Bi_2O_3$ | 0.5∼65%, |
| $Sb_2O_3 + Bi_2O_3 + PbO$ | 34∼74%, |
| in which $Sb_2O_3$ | 0∼50%, |
| $Bi_2O_3$ | 0∼25%, |
| PbO | 0∼63%, |
| $Y_2O_3 + La_2O_3 + Gd_2O_3 + Yb_2O_3 + Lu_2O_3 + Ga_2O_3 + In_2O_3 + Al_2O_3$ | 1∼15%, |
| in which $Y_2O_3$ | 0∼10%, |
| $La_2O_3$ | 0∼10%, |
| $Gd_2O_3$ | 0∼15%, |
| $Yb_2O_3$ | 0∼10%, |
| $Lu_2O_3$ | 0∼10%, |
| $Ga_2O_3$ | 0∼10%, |
| $In_2O_3$ | 0∼15%, |
| $Al_2O_3$ | 0∼5%, |
| $Li_2O + Na_2O + K_2O + Cs_2O$ | 0∼10%, |
| $MgO + CaO + SrO + BaO$ | 0∼20%, |
| ZnO | 0∼20%, |
| $As_2O_3$ | 0∼10%, |
| and a total amount of $F_2$ contained in a fluoride or fluorides substituted for any of these metal oxide ingredients | 0∼10%. |

* * * * *